United States Patent [19]
Ozeki

[11] Patent Number: 5,588,528
[45] Date of Patent: Dec. 31, 1996

[54] OPTICAL RECORDING DISC STORING DEVICE

[75] Inventor: Jiro Ozeki, Toshima-ku, Japan

[73] Assignee: Slidex Corporation, Tokyo, Japan

[21] Appl. No.: 632,833

[22] Filed: Apr. 16, 1996

[30] Foreign Application Priority Data

Sep. 29, 1995 [JP] Japan .................................. 7-252125

[51] Int. Cl.⁶ ..................................................... B65D 85/57
[52] U.S. Cl. ........................ 206/308.1; 206/311; 206/312
[58] Field of Search ............................. 206/308.1, 303.3, 206/425, 307, 309, 310, 311, 312, 313

[56] References Cited

U.S. PATENT DOCUMENTS 5,290,118  3/1994  Ozeki ............................. 206/308.1 X
5,413,215  5/1995  Hardinger, Jr. ................. 206/308.3 X
5,462,160  10/1995  Youngs ................................. 206/312

*Primary Examiner*—Jacob K. Ackun
*Attorney, Agent, or Firm*—Keck, Mahin & Cate

[57] ABSTRACT

A sheet-like storing element for storing an optical recording disc. The storing element is formed at one side with one or more rectangular frames each of which have a circular frame formed therein. In the circular frame, there is a cutout portion which is formed by cutting off a portion of an area which is surrounded by the circular frame. The circular frame is interrupted or cut-off in the vicinity of at least one of corners of the rectangular frame. The sheet-shaped storing element has a film of a flexible material which is attached thereto at a side where the circular frame is formed so that the area surrounded by the circular frame is covered thereby. The circular frame of the storing element has an inner diameter which is larger than the outer diameter of the recording disc which is to be stored in the storing element. The circular frame further has an inner periphery which is slanted radially inwardly to provide a slanted surface which functions to receive the periphery of the recording disc to thereby support the disc with a clearance with respect to other portions of the storing element. The film of flexible material is split along a split line extending in a direction of crossing the circular frame whereby the film can be turned over at one side of the split line to provide an access to the disc stored in the circular frame for taking out the disc by gripping it with fingers.

11 Claims, 12 Drawing Sheets

OPTICAL RECORDING DISC STORING DEVICE

FIELD OF THE INVENTION

The present invention relates to a device for storing optical recording discs, such as CD or MD, having optical surfaces adapted for optical recording of information. More specifically, the present invention pertains to a device for storing optical recording discs in substantially planar sheet-like storing elements.

DESCRIPTION OF PRIOR ART

Conventionally, optical recording discs such as CD or MD are transported and displayed for sales by being contained in cases of rectangular configuration. The cases are generally made of a hard plastics material and formed with a circular recess for receiving a disc. At the center of the circular recess, there is provided a resilient support boss which is adapted to be engaged by a central aperture formed in the disc and support the disc with a clearance with respect to the bottom surface of the recess. The case has a lid or a closure which has an inside pocket for storing a leaflet which indicates the contents of recorded information in the disc.

Such known type of storing cases for optical recording discs such as CD or MD is in general large in thickness so that a lot of space is required in storing the discs contained in the cases. It should also be noted that the conventional disc storing cases are inconvenient in searching and detecting a desired one of the discs among a number of the discs stored for example in a shelf or a cabinet. It is very often necessary to take out a case having a disc contained therein and read the leaflet to make sure that the disc is the desired one. A further difficulty encountered in the conventional disc storing case is that a plurality of discs cannot be observed simultaneously at a glance in the stored condition.

SUMMARY OF THE INVENTION

It is therefore an object of the present invention to provide an optical recording disc storing device wherein one or more recording discs are stored in a planar sheet-like storing element.

Another object of the present invention is to provide an optical recording disc storing device wherein a plurality of recording discs can be stored in a planar sheet-like storing element in a manner that the recording discs stored therein can be simultaneously observed at a glance.

A further object of the present invention is to provide an optical recording disc storing device wherein a plurality of recording discs are stored together with leaflets thereof so that in a planar sheet-like storing element so that the leaflets for a plurality of recording discs can be observed simultaneously.

According to the present invention, the above and other objects can be accomplished by a sheet-like storing element for storing at least one recording disc. The storing element is formed at least at one side with at least one rectangular frame which has a circular frame formed therein. In the circular frame, there is a cutout portion which is formed by cutting off at least a portion of an area which is surrounded by the circular frame. The circular frame is interrupted or cut-off in the vicinity of at least one of corners of the rectangular frame. The sheet-shaped storing element has a film of a flexible material which is attached thereto at a side where the circular frame is formed so that the area surrounded by the circular frame is covered thereby. The circular frame of the storing element has an inner diameter which is larger than the outer diameter of the recording disc which is to be stored in the storing element. The circular frame further has an inner periphery which is slanted radially inwardly to provide a slanted surface which functions to receive the periphery of the recording disc to thereby support the disc with a clearance with respect to other portions of the storing element. The film of flexible material is split along a split line extending in a direction of crossing the circular frame whereby the film can be turned over at one side of the split line to provide an access to the disc stored in the circular frame for taking out the disc by gripping it with fingers.

The split line preferably comprises a cross-direction split line section which is offset toward one side with respect to the center of the recording disc, and at least one longitudinally extending split line section extending from one end of the cross-direction split line section longitudinally in the direction of said one side. The split line sections thus form a flap portion in the flexible film which can be turned over as mentioned above. In an embodiment wherein a pair of longitudinally extending split line sections are formed to extend from the opposite sides of the cross-direction split line section, a flap portion of a rectangular configuration will be formed.

According to a preferable mode, the storing element of the present invention has a flexible film which is formed at a portion opposite to the portion where the flap is formed with a second split line which passes through the central aperture of the disc stored in the element. In this structure of the recording disc storing element, the recording disc can be taken out of the circular frame by gripping the disc by applying one finger to the periphery of the disc through the cutout formed in the circular frame and another finger to the central aperture of the disc through the second split line.

It is preferable that the storing element is made by forming a thin sheet of a hard plastic material. Alternatively, the storing element may be formed by a hard paper, such as a cardboard. The storing element may be provided at the side opposite to the side where the circular frame is formed with a pocket for storing a leaflet for the recording disc which is to be stored in the circular frame. A pair of storing elements of similar configurations may be provided and attached together at sides opposite to the sides where the circular frames are formed to thereby provide storing sections at the opposite sides of the storing device.

According to a further preferable aspect of the present invention, the rectangular frame and the circular frame are provided by ridges formed in a sheet material for forming the storing element. Preferably, the storing element is provided at one of its peripheral edge portions with means for binding the storing element in a binder. Thus, a plurality of recording disc storing elements can be held in a book-shaped binder.

It is preferable that a nonwoven fabric is attached to the storing element in a manner that the fabric covers the cutout portion in the storing element. The fabric will then function to protect the edge of the recording disc from being rubbed or scratched in inserting into or taking out of the storing section formed in the storing element. It is also preferable that the flexible film covering the storing section of the storing element is made of a transparent or translucent material so that the disc stored in the storing section can be observed through the film.

In accordance with the present invention, the rectangular frame formed in the storing element and the circular frame formed in the rectangular frame serve to increase the rigidity of the element. It is therefore possible to form the storing element with a thin sheet material. For example, the storing element can be produced through die forming of a sheet of a hard plastic material the slanted side surface formed on the inner periphery of the circular frame supports the recording disc with a clearance between the disc and the bottom of the area surrounded by the circular frame. Therefore, it is possible to eliminate the risk of the optical surface of the recording disc being scratched by the material of the storing element when the disc is being inserted into or taken out of the storing section. The circular frame is cut off in the vicinity of at least one of the four corners of the rectangular frame. Thus, it is possible to have an access through the cut-off portion by a finger to touch or grip the edge of the recording disc. In a structure where a nonwoven fabric is attached to the storing element at the cutout portion, the disc may be moved with the edge portion sliding on the fabric. Therefore, it is possible to prevent the disc from contacting other portions of the storing element when the disc is being inserted into or taken out of the storing section. Scratching recording discs can therefore be effectively avoided.

The above and other objects and features of the present invention will become apparent from the following description of preferred embodiments taking reference to the accompanying drawings.

DESCRIPTION OF THE PREFERRED EMBODIMENT

Figure 1:
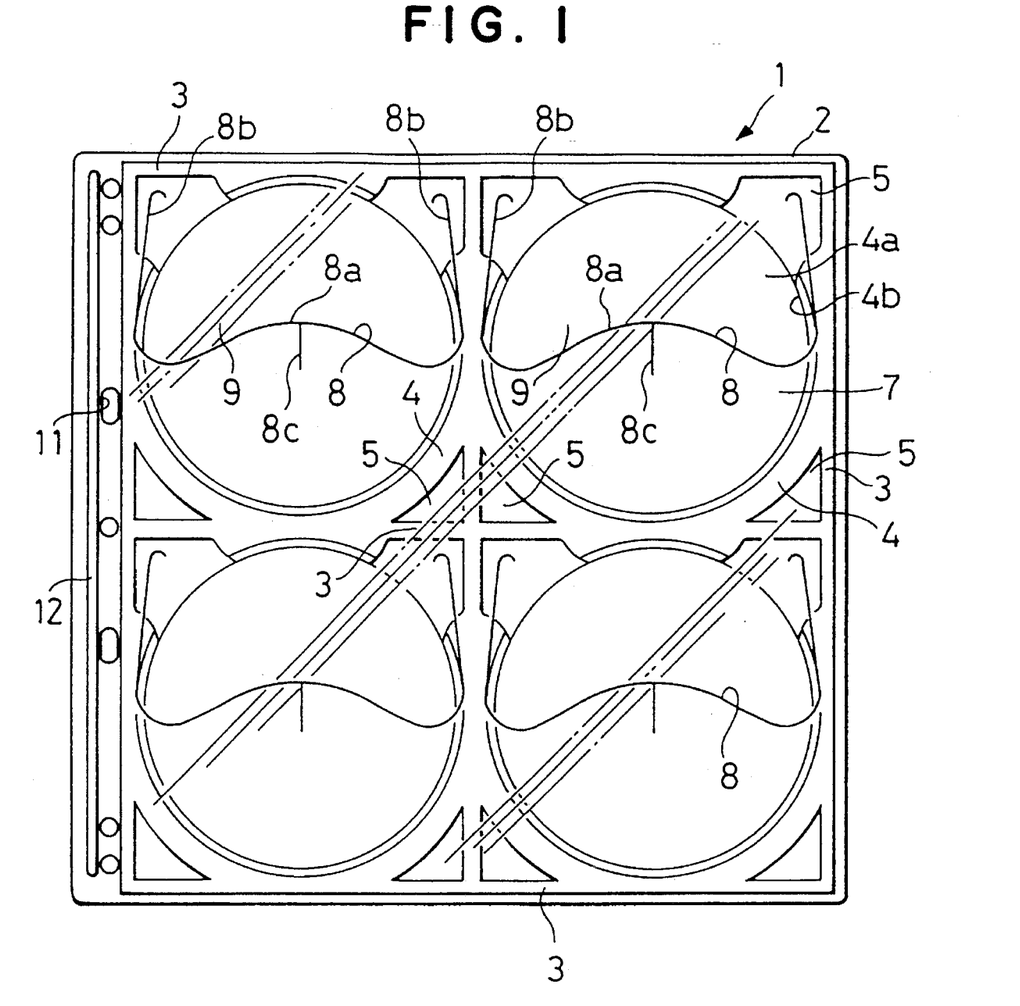
FIG. 1 is a plan view of a recording disc storing element in accordance with one embodiment of the present invention.
Figure 5:
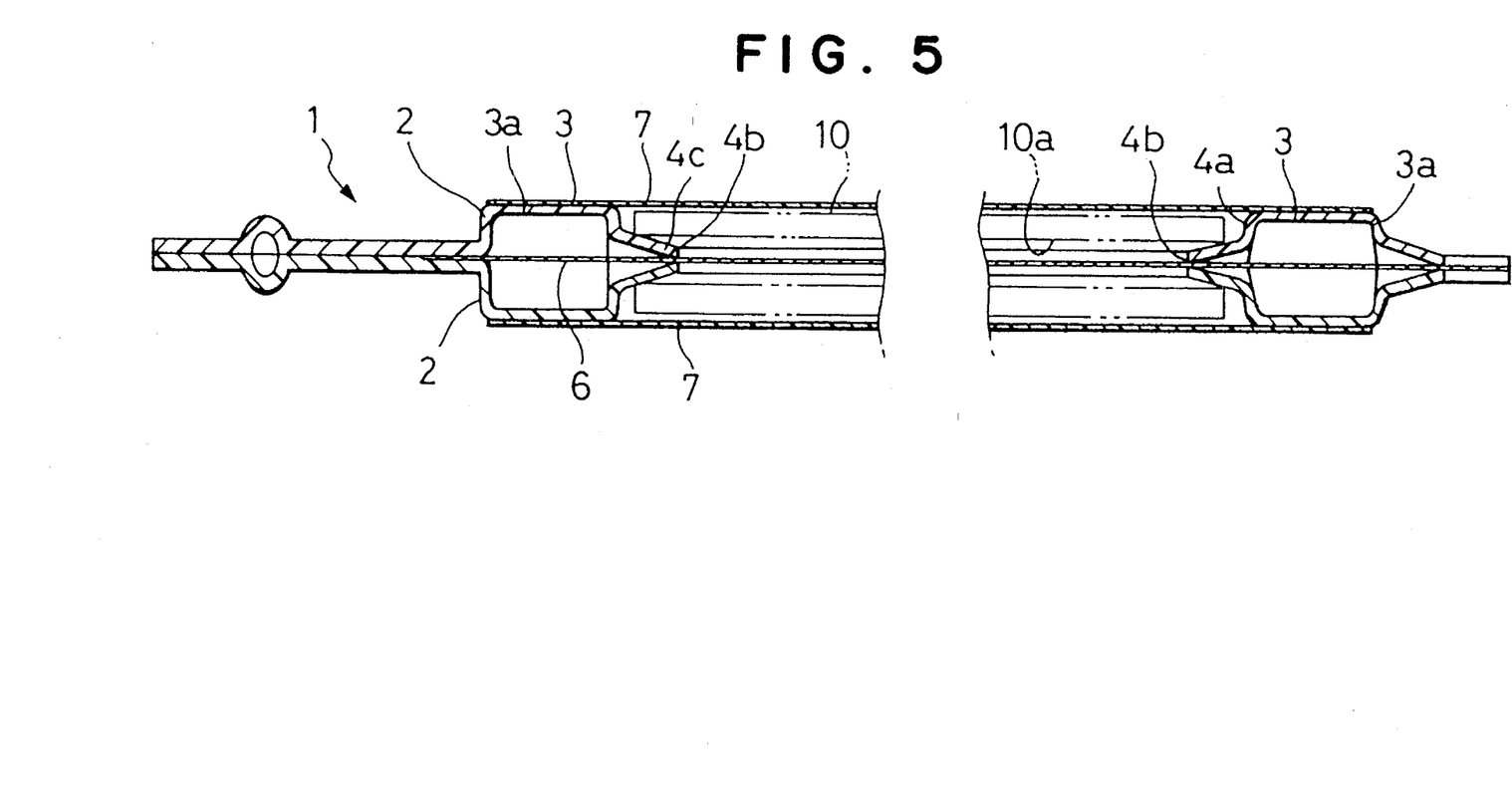
FIG. 5 is a sectional view of the recording disc storing element taken substantially along the line 5—5 in FIG. 4.

Referring now to the drawings, particularly to FIGS. 1 through 5, there is shown an embodiment of the present invention. In FIG. 1, it will be noted that the optical recording disc storing element 1 in accordance with the embodiment of the present invention comprises a sheet 2 which is made by die forming of a thin sheet material of a hard plastic. Alternatively, the sheet 2 may be made of a cardboard. In this particular embodiment, four rectangular frames 3 are formed in rows and columns. As shown in FIG. 5, the rectangular frames 3 are provided in the form of a ridge which is formed by shaping a thin sheet material of a hard plastic in appropriately shaped dies.

In each of the rectangular frames 3, there in formed a circular frame 4 which is surrounded by the rectangular frame 3. The circular frame 4 is also provided in the form of a ridge shaped in the hard plastic sheet material and defines a circular recess 4a surrounded by the circular frame 4. In the particular embodiment, the circular frame 4 has portions which are merged into the rectangular frame 3 so that the circular frame 4 is not clearly separated from the rectangular frame 3. It should however be noted that the circular frame 4 may be formed in a form separated from the rectangular frame 3. the circular frame 4 formed in the rectangular frame 3 defines a substantially triangular recess 5 in each corner of the rectangular frame 3. The structure is believed to be effective to increase the rigidity of the storing element 1.

Figure 2:
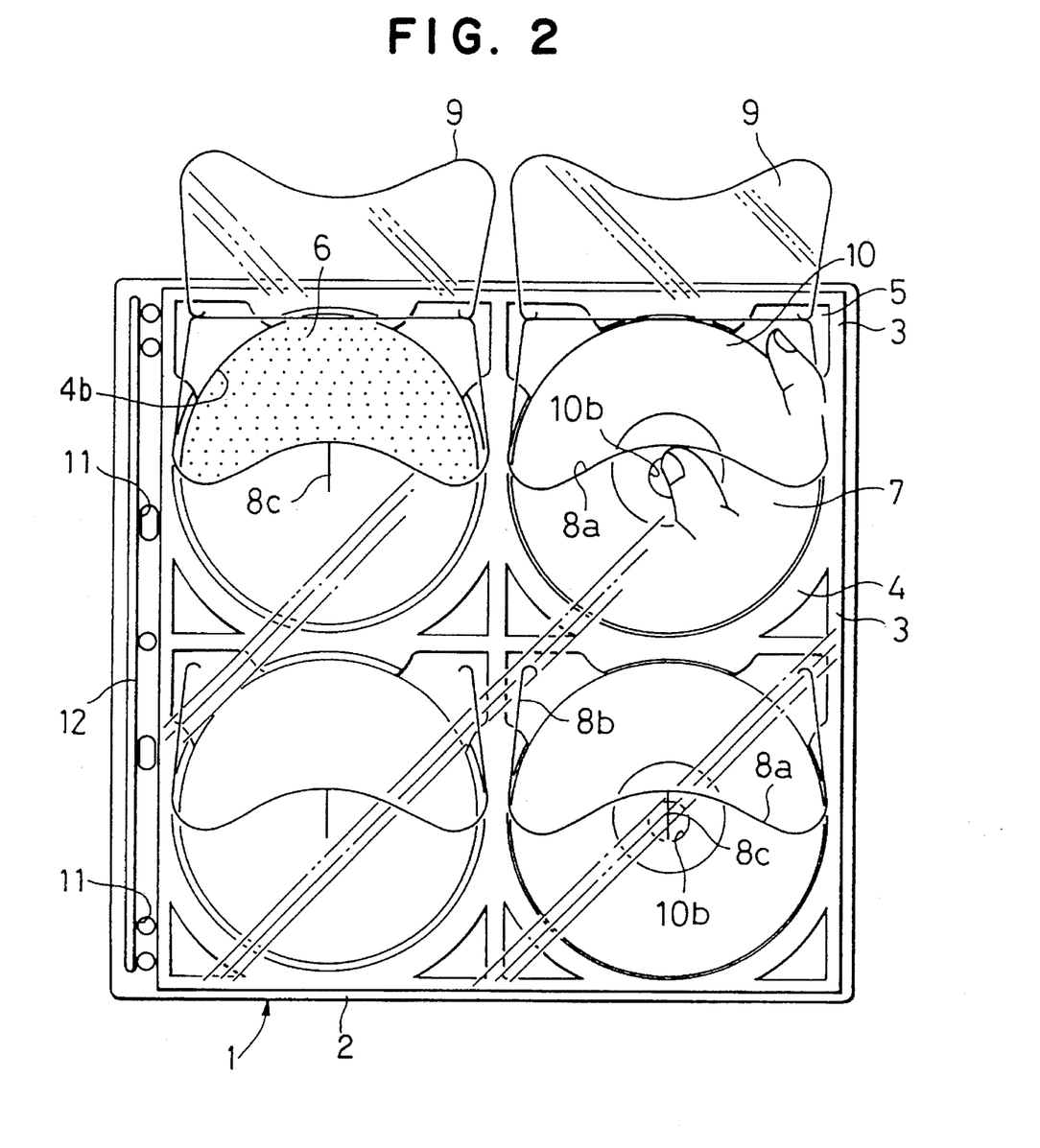
FIG. 2 is a plan view of the recording disc storing element shown in FIG. 1 in use.
Figure 3:
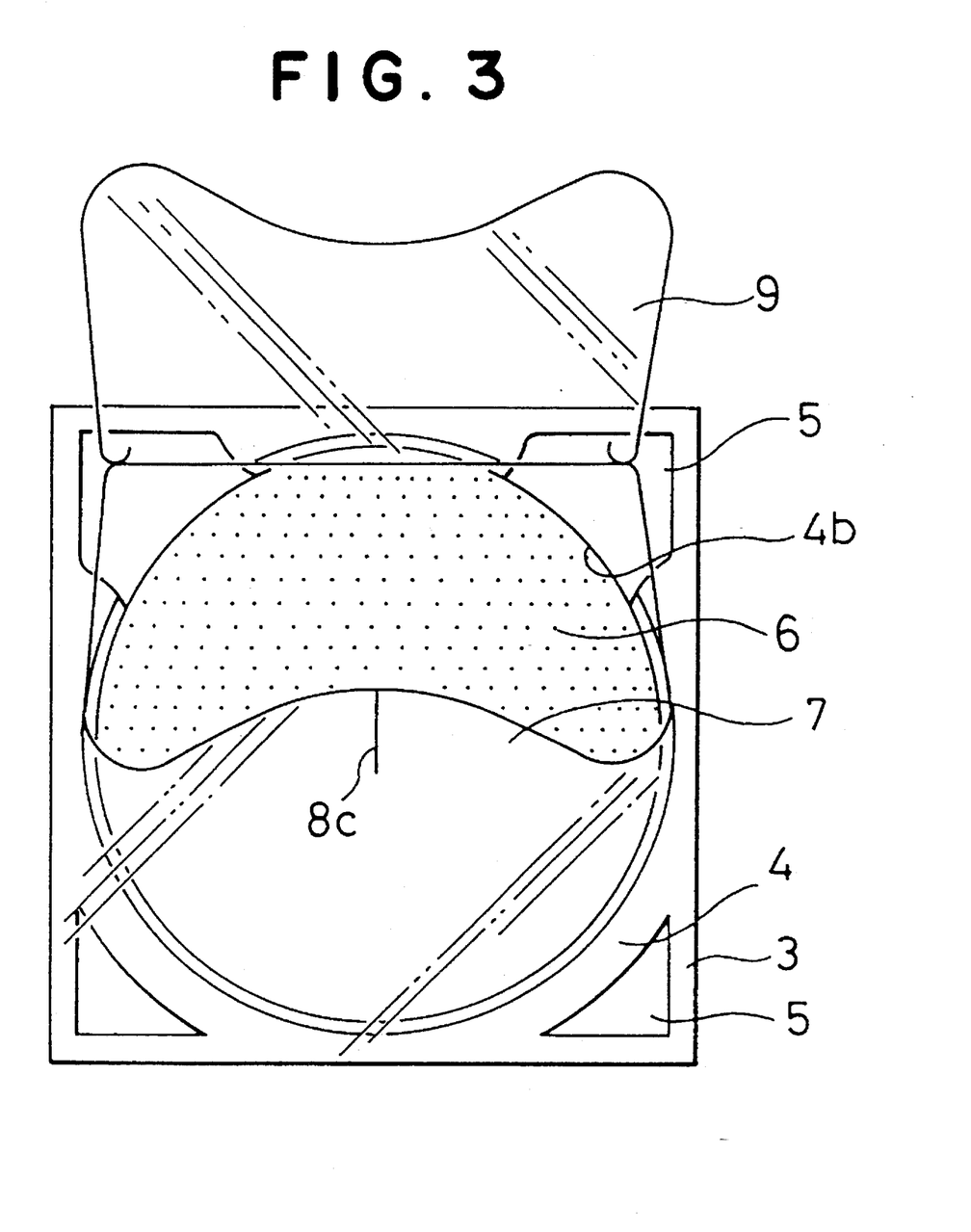
FIG. 3 is a plan view showing in an enlarged scale one storing section of the recording disc storing element shown in FIGS. 1 and 2.
Figure 4:
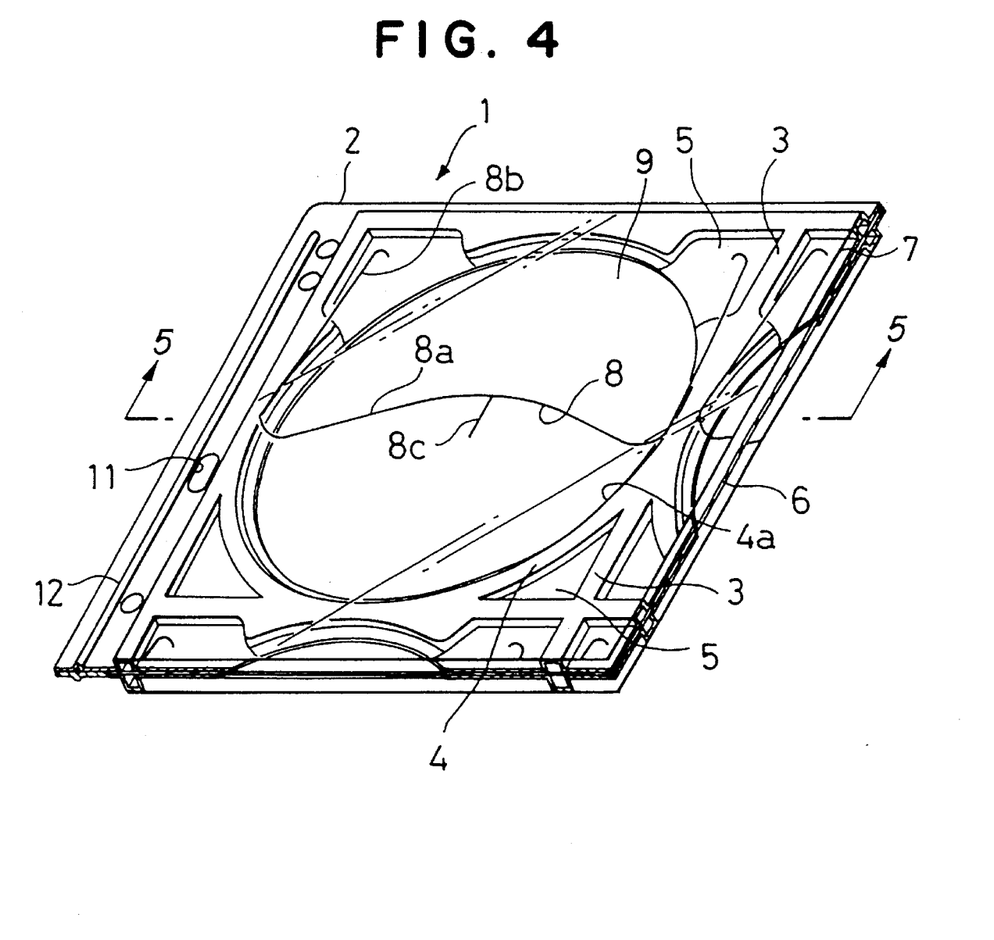
FIG. 4 is a partially sectioned perspective view showing a portion of the recording disc storing element.

In the particular embodiment which is being discussed, the circular frame 4 is cut off at portions adjacent to two corners of the rectangular frame 3. Thus, the rectangular recesses 5 in these corners are connected with the circular recess 4a defined by the circular frame 4. As shown in FIGS. 2, 3 and 5, the sheet material forming the sheet 2 is cut out along the circular inner periphery of the circular frame 4 to thereby provide a circular opening 4b.

In this embodiment, two sheets 2 are joined together to form a single storing element 1. Each of the sheets 2 has four rectangular frames 3 arranged in rows and columns and a circular frame 4 is formed in each of the rectangular frames 3. The sheets 2 of identical structures are mated and bonded together at the back side which is the side opposite to the side where the frames 3 and 4 are formed. Between the two sheets 2, there is disposed a nonwoven fabric 6 which is located to cover the circular openings 4b in the circular frames 4 formed in the sheets 2.

A film 7 of a transparent plastic material is attached to each of the sheets 2 at the front side thereof. The film 7 is located to cover substantial part of the front surface of each sheet 2. The film 7 is bonded to the sheet 2 along four peripheral edges of the sheet 2. The plastic film 7 is provided with a slit along a split line 8 at a portion corresponding to each of the rectangular frames 3 formed in the sheet 2. The slit 8 is configured to provide a substantially rectangular flap 9 which is located to cover an upper half of the corresponding rectangular frame 3. A shown in FIGS. 2 and 3, the flap 9 can be upwardly turned over to provide an access to a disc storing section defined by the circular recess 4a in the circular frame 4 for insertion into or taking out of an optical recording disc such as a CD with respect to the storing section provided by the circular recess 4a in the circular frame 4. FIG. 3 shows only one rectangular frame 3 among four rectangular frames 3 shown in FIG. 2.

The split line 8 for the slit is comprised of a cross-direction split line section 8a extending in a direction transversely crossing the circular frame 4 at a position upwardly offset from the position where the central aperture 10a of the recording disc 10 is to be located when the disc 10 is stored in the circular recess 4a, and a pair of longitudinally extending split line sections 8b extending longitudinally from the opposite ends of the cross-direction split line section 8a. The split line sections 8a and 8b define the aforementioned flap 9 of substantially rectangular configuration. It should however be noted that only one longitudinally extending split line section 8b may be provided to define a flap of substantially triangular configuration.

In the structure of this embodiment, the plastic film 7 is formed at a side opposite to the flap 9 with a second split line section 8c which extends from an intermediate portion of the cross-direction split line section 8a through a position where the central aperture 10a of the recording disc 10 is to be located when the disc 10 is stored in the circular recess 4a. The slit formed along the second split line section 8c facilitates gripping by fingers the recording disc 10 when the disc 10 is to be inserted into or taken out of the storing section defined by the circular recess 4a.

Referring further to FIG. 5, it will be noted that the circular frame 4 is formed along the inner periphery thereof with a slanted surface 4c which is slanted radially inwardly. The slanted surface 4c is of a dimension whereby a diameter is defined for receiving the peripheral edge of the recording disc 10. It will therefore be understood that the recording disc 10 is supported at its peripheral edge portion by the slanted surface 4c when the disc 10 is inserted into the circular recess 4a with a clearance between the disc 10 and the nonwoven fabric 6. It is therefore possible to store the recording disc 10 with its recording surface or optical surface 10a satisfactorily protected against scratching by inserting the disc 10 with the optical surface 10a faced toward the nonwoven fabric 6.

When the recording disc 10 is to be taken out from the storing section defined by the circular recess 4a, access is made by fingers through the cut-off portion formed in the circular frame 4 to the edge portion of the recording disc 10. The edge portion of the disc 10 can then readily be gripped by the fingers and taken out of the circular recess 10a. In the illustrated embodiment, the plastic film 7 is formed with the aforementioned slit along the second split line section 8c so that portions of the film can be split apart to obtain access by one of the fingers to the central aperture 10a of the recording disc 10. The edge portion of the recording disc 10 can be reached by another finger through the cut-off portion formed in the circular frame 4 to thereby grip the disc 10 by two fingers. In this instance, the edge portion of the recording disc 10 may contact the bottom portion of the circular recess 4a, however, there will be no risk of the recording disc 10 being scratched because of the nonwoven fabric 6 provided at the bottom portion of the circular recess 4a.

Figure 6:
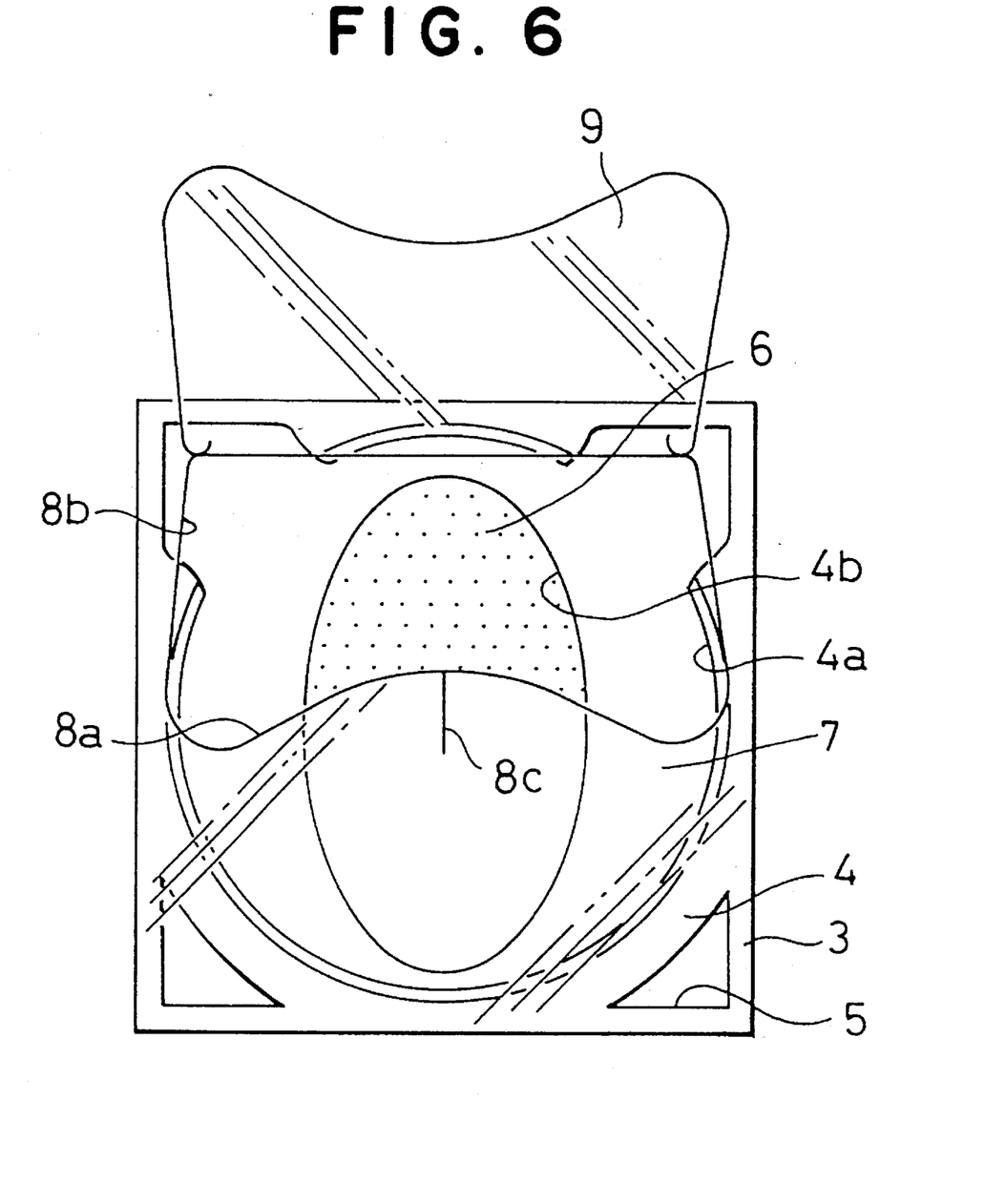
FIG. 6 is a plan view similar to FIG. 3 but showing another embodiment.

FIG. 6 shows another embodiment of the present invention. In the embodiment, corresponding parts are shown by the same reference numerals as in the previous embodiment and detailed description will be omitted. In this embodiment, the basic structures are the same as in the previous embodiment. The only difference between the embodiment shown in FIG. 6 and that shown in FIGS. 1 through 5 is that in the embodiment of FIG. 6 the cutout opening 4b formed in the circular recess 4a is not of a circular configuration but of an oval shape. It is preferable that the oval cutout opening 4b in this embodiment is oriented so that the major axis of the oval shape is directed substantially along the direction in which the recording disc 10 is taken out of the circular recess 4a.

Figures 7A, 7B:
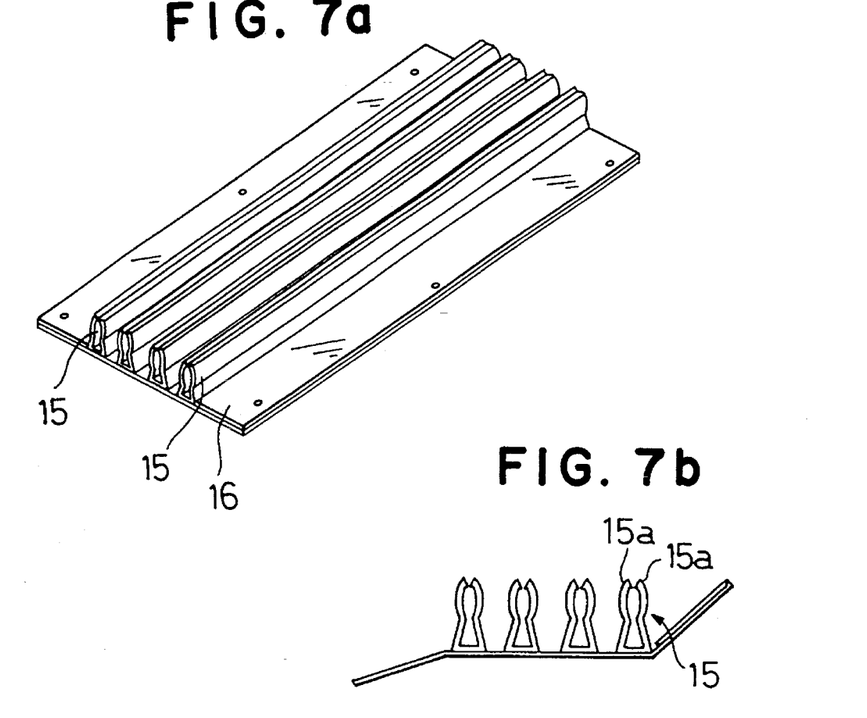
FIG. 7(a) is a perspective view of a back member of a binder having clipping members.
FIG. 7(b) is a sectional view of the back member of the binder shown in FIG. 7(a)
Figure 7C:
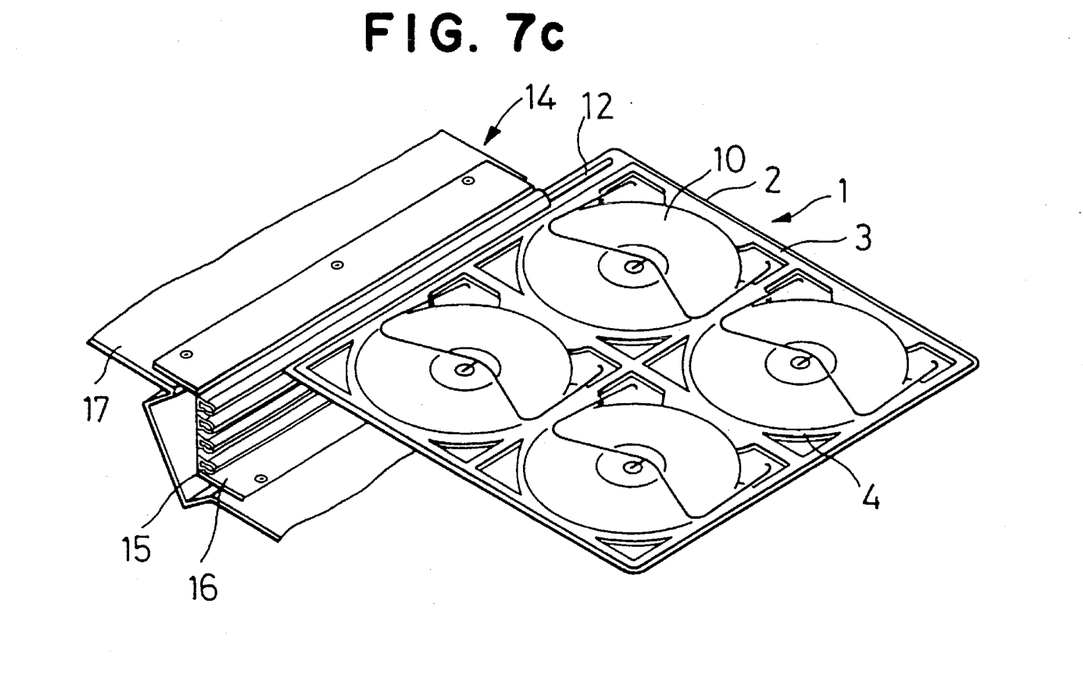
FIG. 7(c) is a perspective view of the binder in use.
Figure 8:
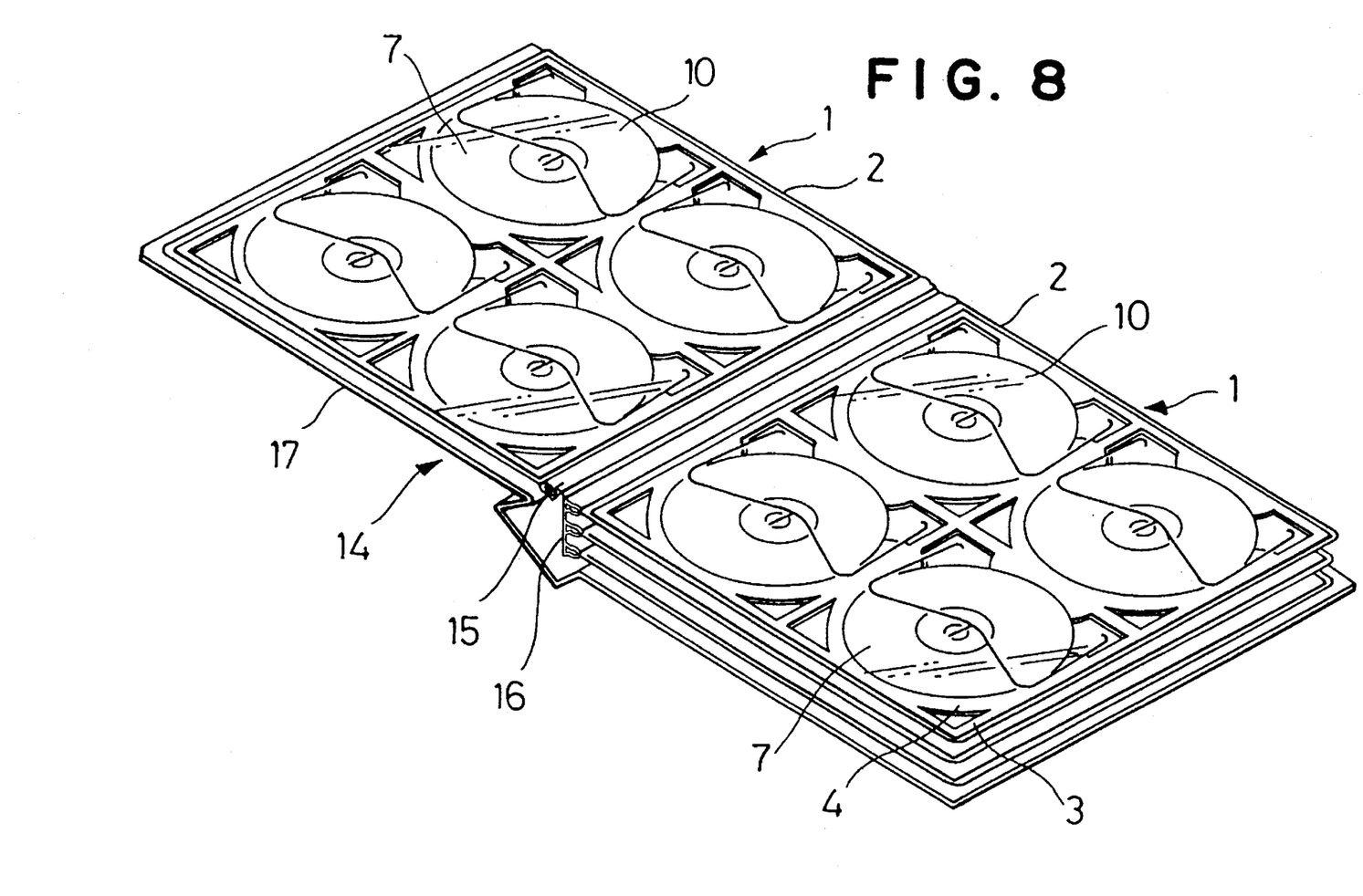
FIG. 8 is a perspective view of the binder shown in FIG. 7 with recording disc storing elements held therein.

Referring again to FIGS. 1 and 2, it will be noted that the storing element 1 is formed along one of the peripheral edge portions with a series of apertures 11 for binding the storing element 1 in a book-shaped binder. The storing element I is further formed along the aforementioned one edge portion with one or a series of binding ridges 12. In FIGS. 7(a), (b) and (c), there is shown one example of binder 14 which is used to hold the storing element 1 by means of the binding ridge or ridges 12. The binder 14 comprises a binder back 16 and a binder cover 17 attached to the opposite sides of the binder back 16. The binder back 16 has a plurality of elongated gripping members 15 each having a pair of opposed gripping pawls 15a. The plurality of gripping members 15 are arranged in parallel to each other on the inner surface of the binder back 16. As shown in FIG. 7(c), the storing element I is held by the gripping member 15 with the ridge or ridges 12 engaged with the gripping pawls 15a. FIG. 8 shows the storing elements I held in the binder 14.

Figure 9:
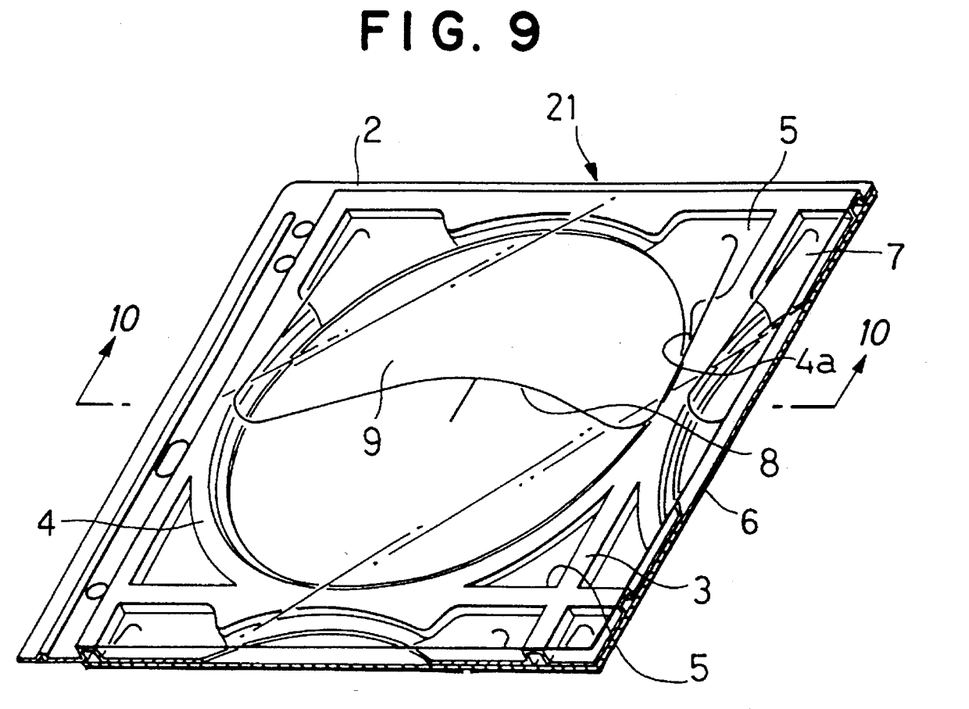
FIG. 9 is a perspective view similar to FIG. 4 but showing a further embodiment.
Figure 10:
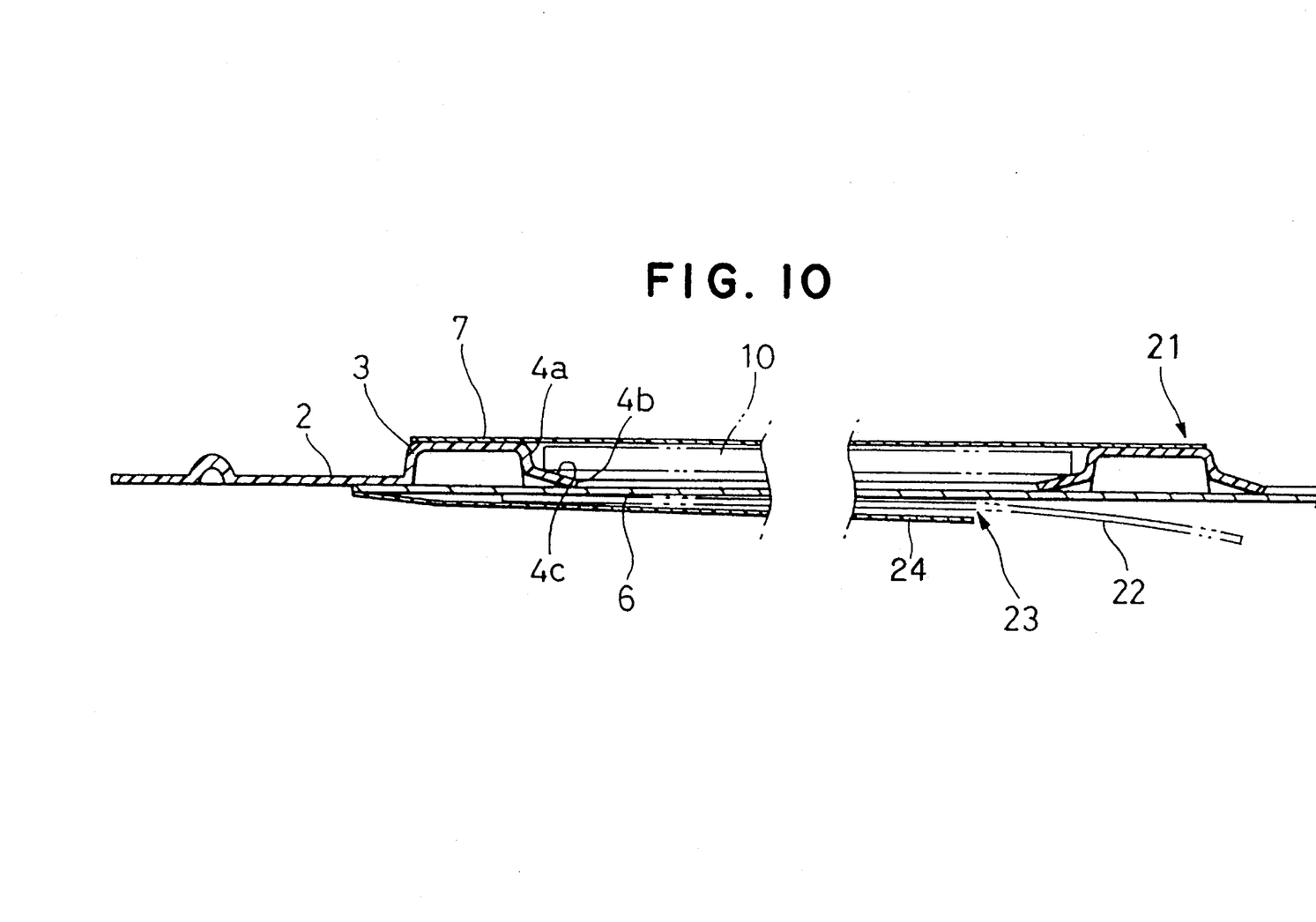
FIG. 10 is a sectional view of the embodiment shown in FIG. 9 taken substantially along the line 10—10 in FIG. 9.
Figure 11:
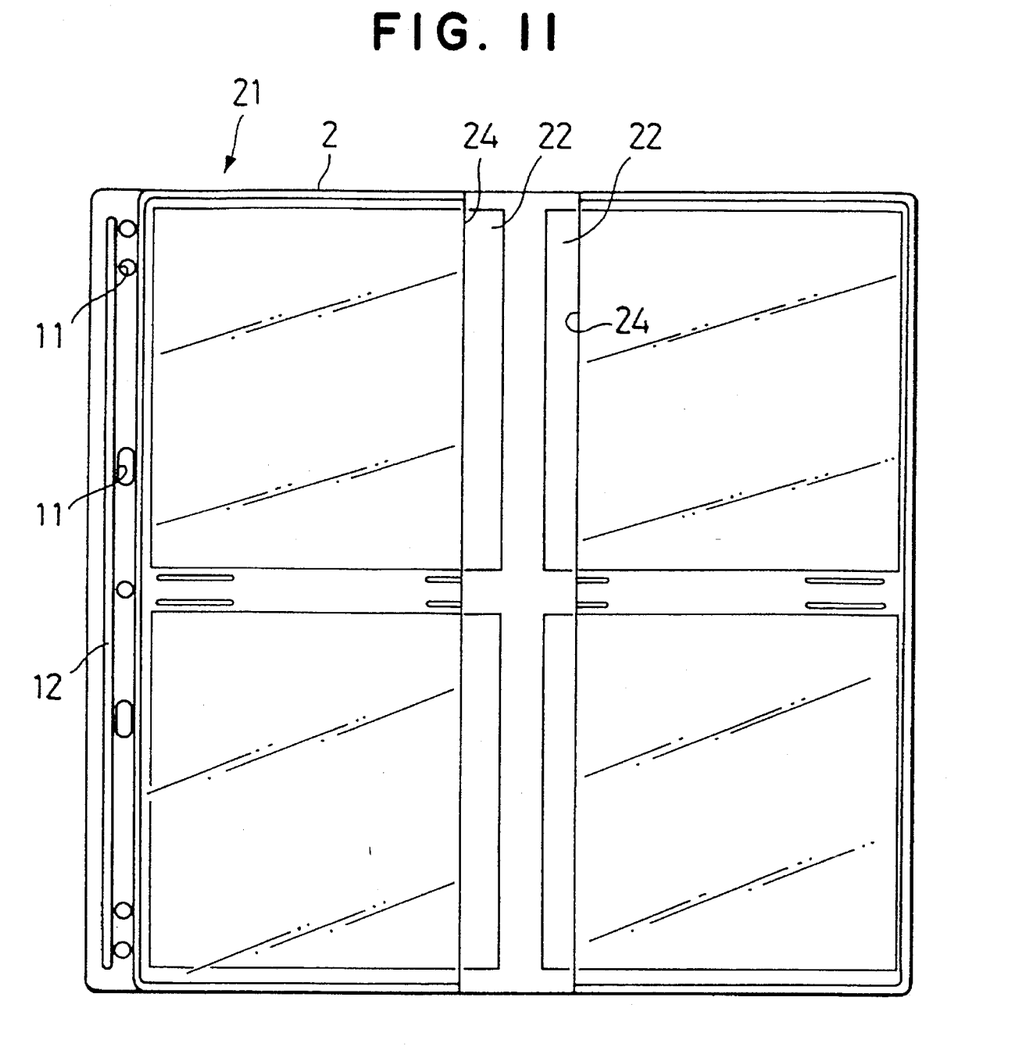
FIG. 11 is a rear side view showing the rear side of the recording disc storing element shown in FIG. 9; and, FIG. 12 is a plan view showing the storing elements of FIG. 9 held in a binder.

FIGS. 9 through 11 show a further embodiment of the present invention. In this embodiment, there is provided a recording disc storing element 21 which is made of a single sheet 2. The sheet 2 has a structure which is the same as that of the sheet 2 in the embodiment of FIGS. 1 through 5. Therefore, in FIGS. 9 through 11, corresponding parts are designated by the same reference numerals and detailed description will be omitted. The sheet 2 has a nonwoven fabric 6 attached thereto at the back side to cover the circular cutout opening 4b formed in the circular recess 4a in the circular frame 4. In the front side, the sheet 2 has a film 7 of a transparent plastic material which is bonded thereto as in the previous embodiments. The film 7 is formed with a flap 9 defined by a split line 8. The circular frame 4 is formed at the inner periphery with a slanted surface 4c for receiving the edge portion of the recording disc 10.

Figure 12:
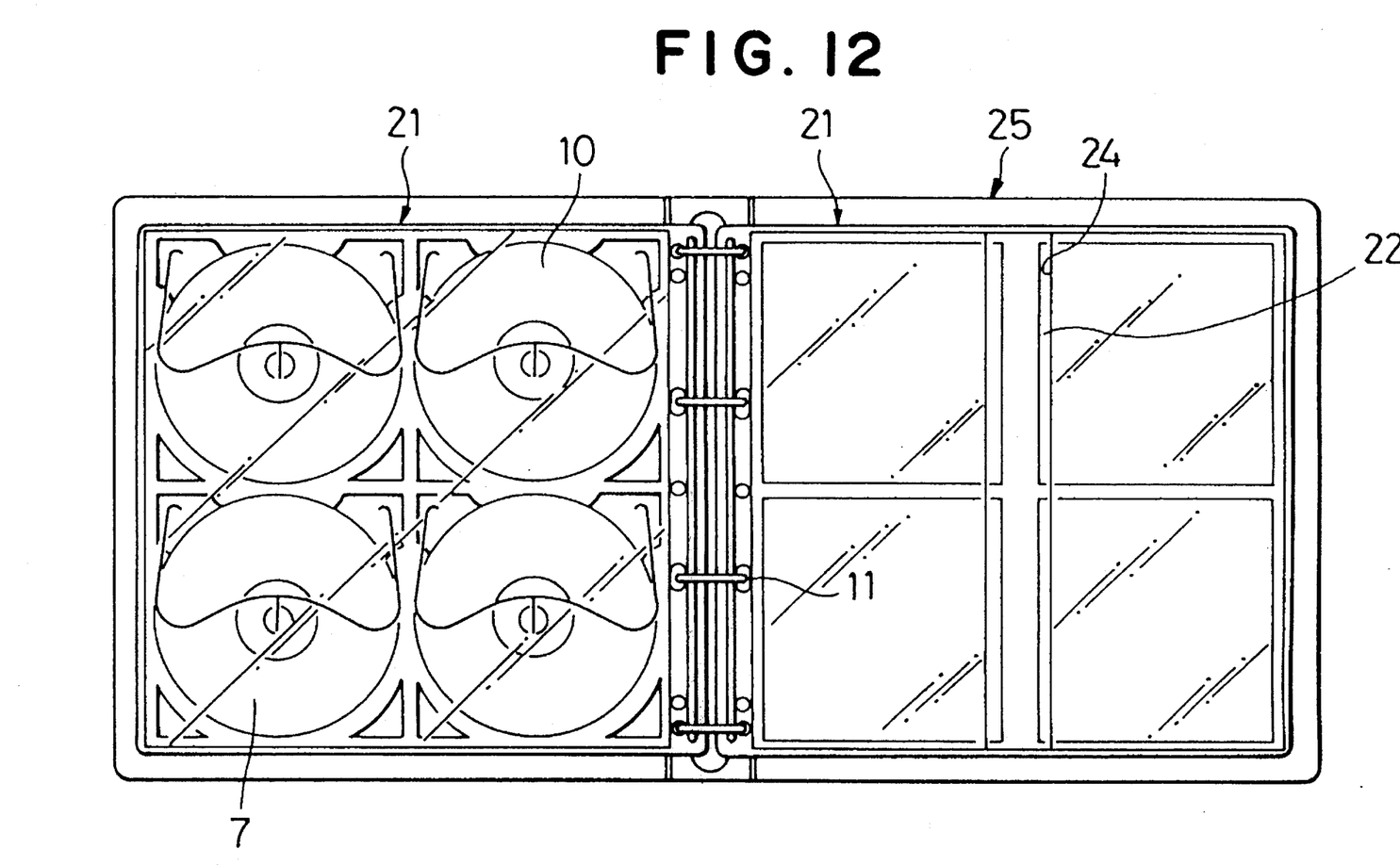

According to this embodiment, the sheet 2 of the storing element 1 is provided at the back side with pockets 23 for storing leaflets 22 for the recording discs 10 stored in the circular recesses 4a formed in the front side thereof. The leaflets have descriptions on the contents of information recorded in the recording discs 10. For providing the pockets 23, a pocket forming sheet 24 is attached to nonwoven fabric 6 which is bonded to the back side of the sheet 2. FIG. 12 shows a binder 25 holding the storing elements 21 by means of the binding apertures 11 formed along an edge portion of the sheet 2.

According to the present invention, optical recording discs can be stored in one or more thin storing elements of sheet-like configurations. It is therefore possible to reduce the space for storing such discs. The circular frame for providing a storing section is provided with a radially inwardly slanted surface for receiving the edge portion of the recording disc. Thus, the recording disc is supported in the circular recess with a clearance between the disc and the bottom of the circular recess. It is therefore possible to eliminate the risk of the recording disc being scratched in inserting into or taking out of the storing section defined by the circular disc.

The invention has thus been shown and described with reference to specific structures, however, it should be noted that the invention is in no way limited to the details of the illustrated structures but changes and modifications may be made without departing from the scope of the appended claims.

I claim:

1. An optical recording disc storing device which comprises;

a sheet-like storing element having at least one rectangular frame formed on at least one side thereof and a circular frame formed in said rectangular frame which surrounds a circular bottom area, at least a portion of said circular area being cutout to form a cutout opening, said circular frame being cut-off at a position adjacent to at least-one of four corners of said rectangular frame;

a film of a flexible material attached to said storing element at said one side to cover said area surrounded by said circular frame;

said circular frame of said storing element having an inner diameter which is larger than outer diameter of a recording disc which is to be stored in said circular frame, said circular frame having an inner periphery slanted radially inwardly to provide a slanted surface for receiving peripheral edge portion of the recording disc to support the disc with a clearance against said bottom area surrounded by said circular frame;

said film of the flexible material being formed with a slit along a split line extending in a direction crossing said circular frame so that said film can be turned over at one side of said split line to have an access by fingers to the edge portion of the recording disc stored in said circular frame to take out the recording disc.

2. A recording disc storing device in accordance with claim 1 wherein said split line comprises a cross-direction split line section and at least one longitudinally extending split line section extending longitudinally from an end of said cross-direction split line section, said split line sections defining a flap which can be turned over at said one side of said split line.

3. A recording disc storing device in accordance with claim 2 wherein said film is formed at a side opposite to said flap with a second split line which extends from said cross-direction split line section through a position where a central aperture of the recording disc is to be located when the disc is stored in said circular frame.

4. A recording disc storing device in accordance with claim 1 wherein said storing element is formed by a thin sheet of a hard plastic material or a hard paper through a die forming process.

5. A recording disc storing device in accordance with claim 1 wherein said storing element is formed at the opposite side with at least one pocket for storing a leaflet.

6. A recording disc storing device in accordance with claim 1 wherein said storing element is constituted by a pair of sheets of identical configuration, each of said sheets being formed on one side at least one said rectangular frame with a circular frame formed therein, the sheets being attached together at the opposite side to form a single storing element.

7. A recording disc storing device in accordance with claim 1 wherein said rectangular frame and said circular frame are provided by ridges formed in said storing element.

8. A recording disc storing device in accordance with claim 1 wherein said storing element is provided at one of its peripheral edge portions with a device for holding said storing element in a binder.

9. A recording disc storing device in accordance with claim 1 wherein a nonwoven fabric is attached to the storing element to cover said cutout opening.

10. A recording disc storing device in accordance with claim 1 wherein said film is made of a material which allows to see the recording disc stored in the circular frame through the film.

11. A recording disc storing device in accordance with claim 5 wherein said pocket for storing the leaflet is made of a material which allows to see the leaflet stored in the pocket through the material.

* * * * *